US012394936B2

(12) United States Patent
Tomiyama et al.

(10) Patent No.: US 12,394,936 B2
(45) Date of Patent: Aug. 19, 2025

(54) CABLE CONNECTION DEVICE AND POWER FEED CONTROL DEVICE

(71) Applicant: Panasonic Intellectual Property Management Co., Ltd., Osaka (JP)

(72) Inventors: Ryota Tomiyama, Mie (JP); Hideki Kawahara, Mie (JP); Hideki Oka, Tokyo (JP); Kouji Kakiuchi, Osaka (JP); Mizuki Yagura, Osaka (JP); Shinichi Nakamura, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 337 days.

(21) Appl. No.: 18/003,083

(22) PCT Filed: May 17, 2021

(86) PCT No.: PCT/JP2021/018631
§ 371 (c)(1),
(2) Date: Dec. 22, 2022

(87) PCT Pub. No.: WO2022/004161
PCT Pub. Date: Jan. 6, 2022

(65) Prior Publication Data
US 2023/0261417 A1    Aug. 17, 2023

(30) Foreign Application Priority Data

Jun. 29, 2020    (JP) .................................. 2020-112121

(51) Int. Cl.
*H01R 13/52*    (2006.01)
*B60L 53/16*    (2019.01)
(Continued)

(52) U.S. Cl.
CPC .............. *H01R 13/59* (2013.01); *B60L 53/16* (2019.02); *B60L 53/18* (2019.02); *H01R 13/5205* (2013.01); *H01R 2201/26* (2013.01)

(58) Field of Classification Search
CPC ......................... H01R 13/5219; H01R 13/521
See application file for complete search history.

(56) References Cited

U.S. PATENT DOCUMENTS

| 4,191,443 A | 3/1980 | Doyle |
| 6,123,569 A | 9/2000 | Fukushima et al. |

(Continued)

FOREIGN PATENT DOCUMENTS

| EP | 2783902 A2 | 10/2014 |
| JP | H09-161884 A | 6/1997 |

(Continued)

OTHER PUBLICATIONS

Extended European Search Report dated Nov. 14, 2023 issued in the corresponding European Patent Application No. 21832750.0.

(Continued)

*Primary Examiner* — Renee S Luebke
(74) *Attorney, Agent, or Firm* — Rimon P.C.

(57) ABSTRACT

A cable connection device includes a first holder, a second holder and a support. The first holder is configured to hold a tip part of an end of a cable. The second holder is configured to hold an intermediate part of the end. The support is configured to support the first holder. The second holder is fixed with respect to a power feed control device body. The first holder is supported by the second holder through the support to restrict at least movement of the cable in a pulling direction of the cable.

11 Claims, 7 Drawing Sheets

(51) Int. Cl.
*B60L 53/18* (2019.01)
*H01R 13/59* (2006.01)

(56) References Cited

U.S. PATENT DOCUMENTS

| | | | |
|---|---|---|---|
| 7,871,288 B1* | 1/2011 | Lee | H01R 13/502 |
| | | | 439/470 |
| 2011/0056723 A1 | 3/2011 | Slippy et al. | |
| 2011/0059642 A1 | 3/2011 | Slippy et al. | |
| 2012/0048617 A1 | 3/2012 | Mihara et al. | |
| 2016/0261064 A1 | 9/2016 | Saydyk et al. | |
| 2018/0348447 A1* | 12/2018 | Nhep | G02B 6/3847 |
| 2019/0089092 A1 | 3/2019 | Grimm | |
| 2019/0372335 A1 | 12/2019 | Kawamoto et al. | |
| 2023/0261417 A1* | 8/2023 | Tomiyama | H01R 13/5205 |

FOREIGN PATENT DOCUMENTS

| | | |
|---|---|---|
| JP | 2004-185853 A | 7/2004 |
| JP | 2012-048910 A | 3/2012 |
| JP | 2013-504857 A | 2/2013 |
| JP | 2018-125952 A | 8/2018 |
| JP | 2019-515445 A | 6/2019 |
| WO | 2011/031710 A2 | 3/2011 |

OTHER PUBLICATIONS

International Search Report dated Jul. 13, 2021 issued in International Patent Application No. PCT/JP2021/018631, with English translation.

* cited by examiner

CABLE CONNECTION DEVICE AND POWER FEED CONTROL DEVICE

CROSS-REFERENCE OF RELATED APPLICATIONS

This application is the U.S. National Phase under 35 U.S.C. § 371 of International Patent Application No. PCT/JP2021/018631, filed on May 17, 2021, which in turn claims the benefit of Japanese Patent Application No. 2020-112121, filed on Jun. 29, 2020, the entire disclosures of which Applications are incorporated by reference herein.

TECHNICAL FIELD

The present disclosure generally relates to cable connection devices and power feed control devices, and more particularly relates to a cable connection device configured to connect a cable to an electric apparatus, and a power feed control device including the cable connection device.

BACKGROUND ART

Patent Literature 1 is exemplified as one conventional example, which discloses a power feed control device (electric apparatus). The power feed control device in Patent Literature 1 (hereinafter, referred to as a "conventional device") is configured to control feeding power from an external power supply such as a commercial power supply to an electric vehicle. The conventional device is applied to be interposed between: a power plug cable to be connected to the external power supply; and a connector cable to be connected to the electric vehicle.

The connector cable includes a cable body; a charging connector, which is provided at one end of the cable body to be removably connected to a charging inlet of the electric vehicle; a load-side receptacle (cable connection device), which is provided at the other end of the cable body to be removably connected to a load-side connection part of the power feed control device.

CITATION LIST

Patent Literature

Patent Literature 1: JP 2018-125952 A

SUMMARY OF INVENTION

In the load-side receptacle (cable connection device) of the connector cable, relieving tension applied to the cable is needed for protecting the connection with the cable.

It is therefore an object of the present disclosure to provide a cable connection device and a power feed control device, all of which can relieve tension applied to a cable.

A cable connection device according to an aspect of the present disclosure is configured to connect an end of a cable to an electric apparatus. The cable connection device includes: a first holder configured to hold a tip part of the end; a second holder configured to hold an intermediate part of the end; and a support configured to support the first holder. The second holder is fixed with respect to the electric apparatus. The first holder is supported by the second holder through the support to restrict at least movement of the cable in a pulling direction of the cable.

A power feed control device according to an aspect of the present disclosure includes the cable connection device, the cable and the electric apparatus. The electric apparatus is configured to feed power to a load through a power feeding path including the cable, and stop feeding the power to the load in response to that an abnormality is present in the power feeding path.

DESCRIPTION OF EMBODIMENTS

Hereinafter, a cable connection device and a power feed control device according to an embodiment of the present disclosure will be described with reference to the drawings. The drawings to be referred to in the following description of the embodiment are all schematic representations. That is to say, the ratio of the dimensions (including thicknesses) of respective constituent elements illustrated on the drawings does not always reflect their actual dimensional ratio. Configurations in the following description of the embodiment are mere examples of the present disclosure and should not be construed as limiting. Various modifications may be made to the embodiment depending on design and the like as long as the effect of the present disclosure is achieved.

Figure 1:
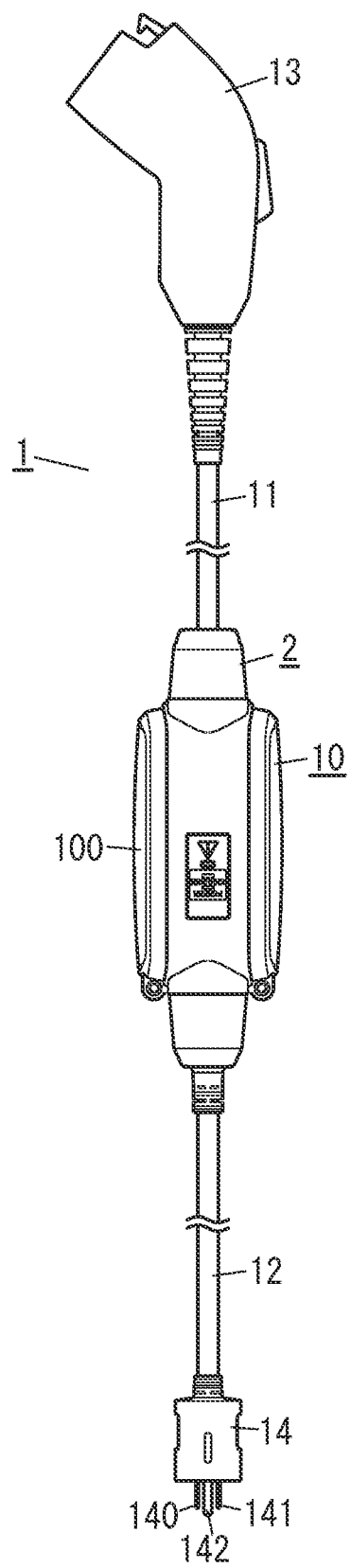
FIG. 1 is a front view of a power feed control device according to an embodiment of the present disclosure.

(1) Explanations of Power Feed Control Device According to Embodiment
(1-1) Overall Configuration of Power Feed Control Device According to Embodiment As shown in FIG. 1, a power feed control device 1 according to an embodiment (hereinafter, simply referred to as the "power feed control device 1") includes a power feed control device body 10, a first cable 11, a second cable 12, a charging connector 13, and an inserting plug 14. The power feed control device 1 is configured to control feeding electric power for charging a battery for motive power, which is installed in an electric vehicle such as an electric car or a plug-in hybrid car.

The inserting plug 14 is configured to be removably inserted into, for example, an outlet installed outdoors and electrically connected to an external power supply (such as a commercial power supply with 100 V or 200 V as an effective value) via the outlet. The inserting plug 14 may include three contactors in total: two contactors 140 and 141 as voltage electrodes; and one contactor 142 as a ground electrode.

Figure 3:
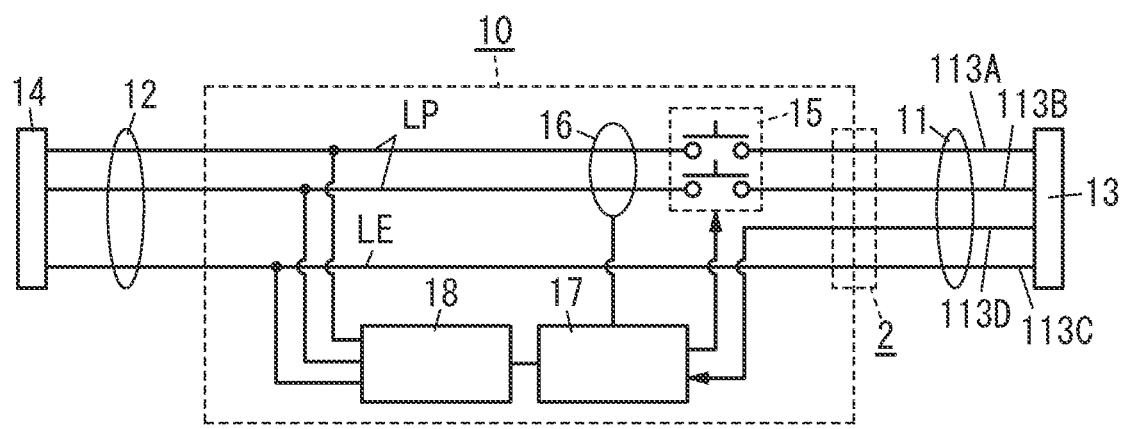
FIG. 3 is a block diagram of a power feed control device body, as one of components that constitute the power feed control device.

The second cable 12 may be implemented as a three-core electric cable (refer to FIG. 3). The second cable 12 has a first end at which the inserting plug 14 is disposed. The second cable 12 further has a second end that is electrically connected to power feeding paths LP and an electric path LE for grounding, of the power feed control device body 10.

The charging connector 13 is removably attached to a charging inlet of the electric vehicle to be electrically and mechanically connected to the charging inlet. The first cable 11 has a first end and a second end, and the charging connector 13 is disposed at the second end of the first cable 11. The first end of the first cable 11 is electrically and mechanically connected to the power feed control device body 10 with a cable connection device 2 according to an embodiment. The first cable 11 may be implemented as a four-core electric cable that includes four electric wires 113 (113A, 113B, 113C, 113D) covered with a sheath 114 (refer to FIGS. 3 and 4).

(1-2) Configuration of Power Feed Control Device Body

Figure 2:
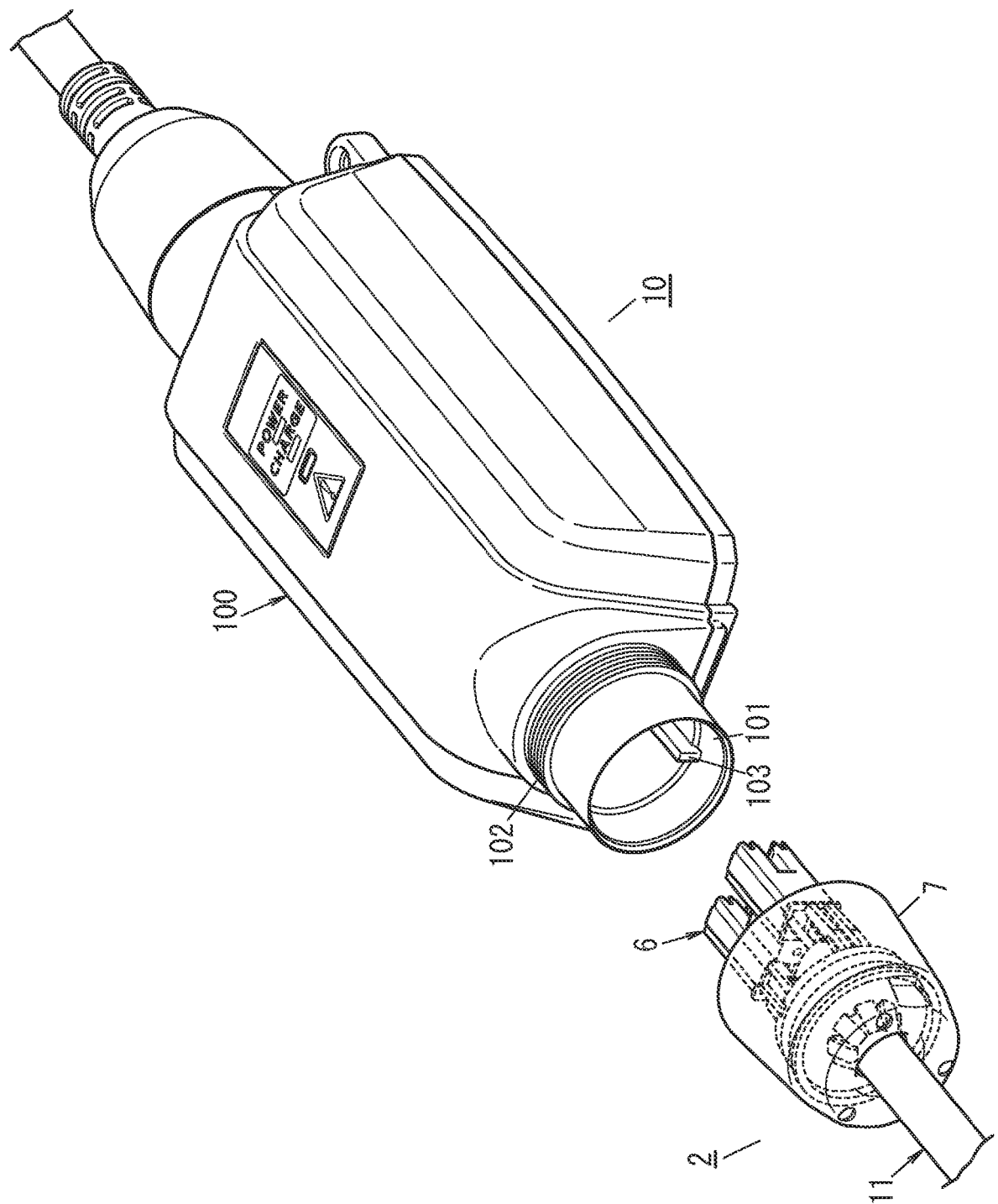
FIG. 2 is an exploded perspective view of the power feed control device, partially omitted.

The power feed control device body 10 includes a casing 100 having an elongated box shape (refer to FIGS. 1 and 2). The casing 100 includes an attachment part 101 to which the cable connection device 2 is attached. The attachment part 101 has a cylindrical shape and is protruded along a longitudinal direction of the casing 100 from a side surface of one end of the casing 100 in the longitudinal direction (refer to FIG. 2).

The casing 100 is provided to accommodate therein an electric circuit of the power feed control device body 10. As shown in FIG. 3, the electric circuit includes a pair of the power feeding paths LP, the electric path LE for grounding, an opening and closing unit 15, a sensor 16, a control unit 17 and a power supply unit 18.

The pair of the power feeding paths LP connect the two electric wires 113A, 113B of the four electric wires 113A to 113D of the first cable 11 to two core wires (respectively connected to the two contactors 140, 141 as the voltage electrodes of the inserting plug 14 in one-to-one) of three core wires (conductors) of the second cable 12. The remaining one core wire of the second cable 12 (i.e., the core wire connected to the contactor 142 as the ground electrode of the inserting plug 14) is connected to one electric wire 113C of the first cable 11 via the electric path LE for grounding.

The opening and closing unit 15 includes two switches respectively disposed in the two power feeding paths LP. The two switches may be implemented as electromagnetic relays or semiconductor relays, for example. The opening and closing unit 15 open or close the two switches interlockingly with each other in accordance with a control signal output from the control unit 17. That is to say, the opening and closing unit 15 open the contacts of the two switches to stop feeding the power to the electric vehicle (load) via the power feeding paths LP, and close the contacts of the two switches to be switched to a state capable of feeding the power to the electric vehicle via the power feeding paths LP.

The sensor 16 may be implemented as a zero-phase current transformer, for example. The sensor 16 detects an unbalanced current flowing through the pair of power feeding paths LP and outputs a detected value of the unbalanced current to the control unit 17.

The power supply unit 18 includes, for example, a series regulator, a switching regulator or any other circuit and converts an AC voltage supplied via the pair of power feeding paths LP into a DC voltage. The power supply unit 18 supplies, to the control unit 17 and any other units, the DC voltage converted.

The control unit 17 includes, for example, a microcontroller as a main component. The control unit 17 is configured to receive a control pilot (CPLT) signal from an Electronic Control Unit (ECU) for the charging control, installed in the electric vehicle, via the electric wire 113D of the first cable 11. The control unit 17 outputs a control signal to the opening and closing unit 15 to close the contacts thereof, when receiving the CPLT signal that includes an instruction to start the power feeding. Also, the control unit 17 is configured to compare the detected value received from the sensor 16 with a prescribed threshold. When finding that the detected value is equal to or more than the threshold, the control unit 17 decides that any abnormality (e.g., electric leakage) has occurred in the electric vehicle. In response to the decision that the abnormality is present, the control unit 17 outputs the control signal to the opening and closing unit 15 to open the contacts thereof to stop feeding the power to the electric vehicle.

(2) Explanations of Cable Connection Device According to Embodiment

Figure 4:
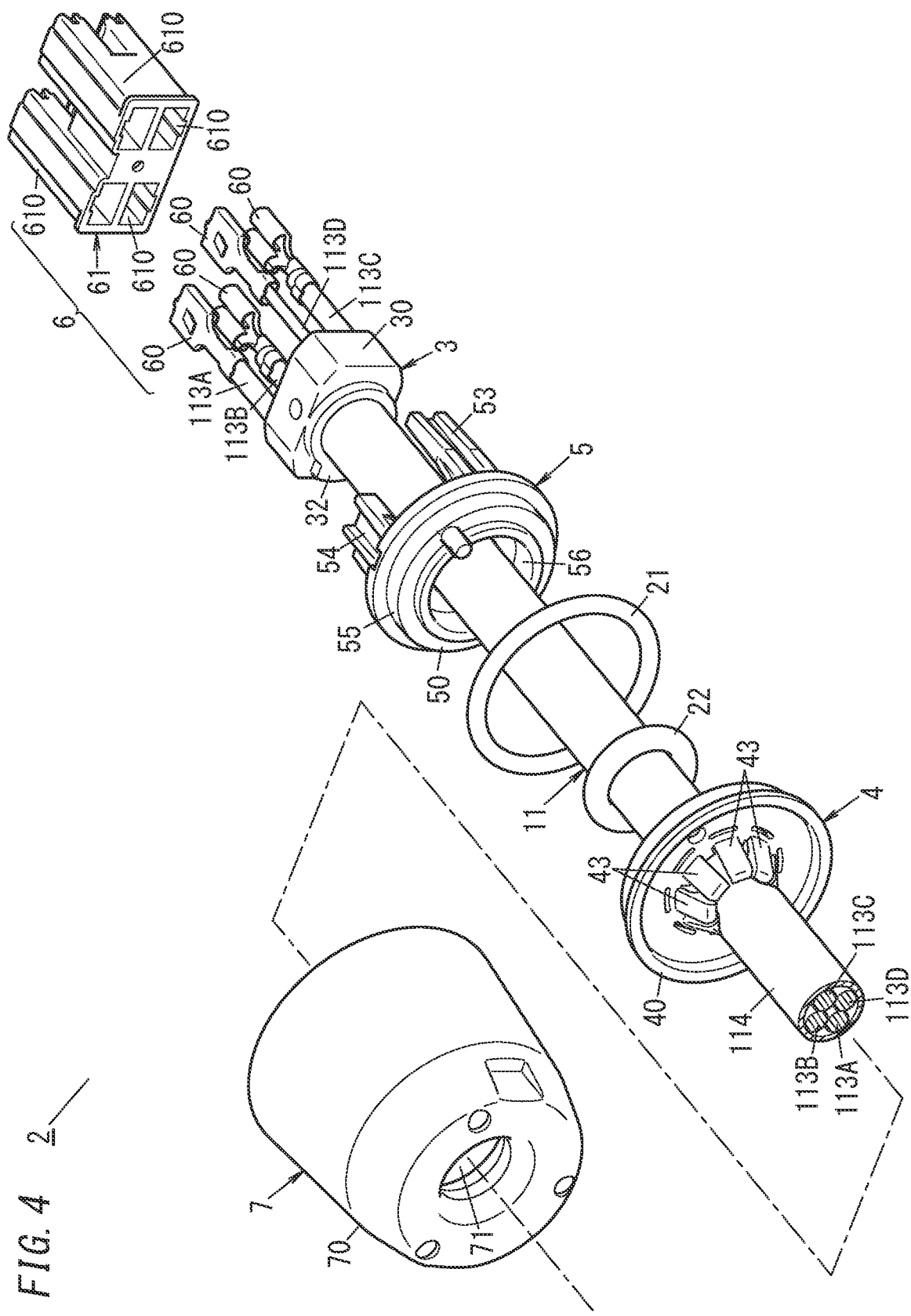
FIG. 4 is an exploded perspective view of a cable connection device according to an embodiment of the present disclosure.
Figure 5:
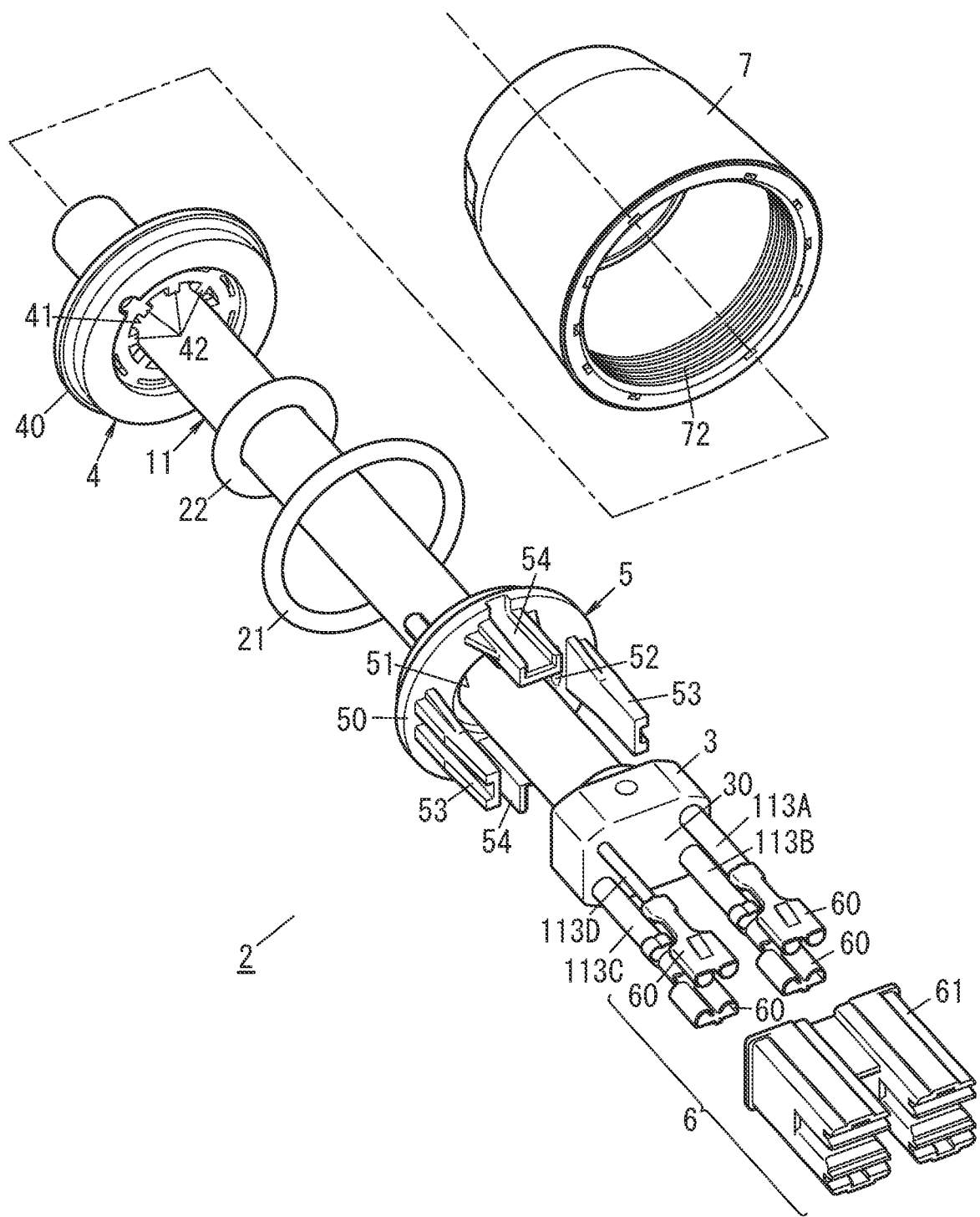
FIG. 5 is another exploded perspective view of the cable connection device.

As shown in FIGS. 4 and 5, a cable connection device 2 according to an embodiment (hereinafter, simply referred to as the "cable connection device 2") includes a first holder 3, a second holder 4, a support 5, a first sealing part 21, a second sealing part 22, a connector 6, and a cap 7.

(2-1) First Holder

Figure 6:
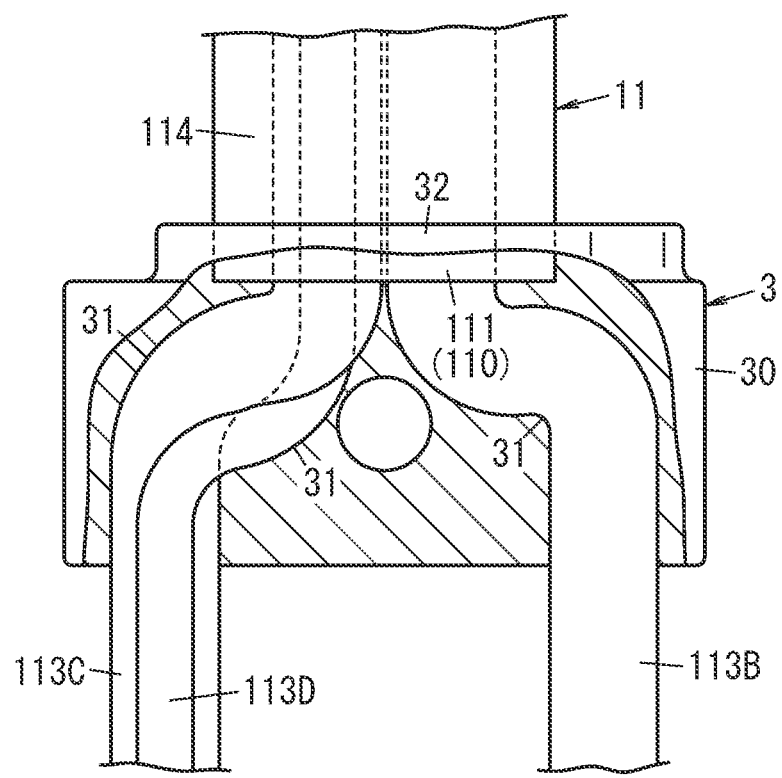
FIG. 6 is a partially cross-sectional view of a first holder of the cable connection device.

The first holder 3 is configured to hold a tip part 111 of an end 110 (i.e., the first end) of the first cable 11 (refer to FIG. 6). The first holder 3 includes a main body 30 (refer to FIGS. 4 and 5), which is made of a synthetic resin material having electrical insulation and has generally a square pole shape, for example. The main body 30 has four insertion holes 31 into which the four electric wires 113A to 113D are respectively inserted in one-to-one (refer to FIG. 6). Those four insertion holes 31 are provided to be curved like S-shapes or bent like Z-shapes. The main body 30 of the first holder 3 may be formed to hold the four electric wires 113A to 113D by simultaneous molding (insertion molding). In this case, each of the four insertion holes 31 may be formed by an interface between the main body 30 made of the synthetic resin material and a corresponding one of the four electric wires 113A to 113D. Alternatively, the main body 30 of the first holder 3 may be configured by coupling two or more synthetic resin molding products. In this case, the two or more synthetic resin molding products may have two or more grooves that form the insertion holes 31 when they are coupled with each other.

Thus, the first holder 3 holds the four electric wires 113A to 113D of the first cable 11 with being curved or bent, which can reduce the chance that the electric wires 113A to 113D are easily pulled out from the insertion holes 31, even when a pulling force is applied to the first cable 11.

(2-2) Second Holder

Figure 7:
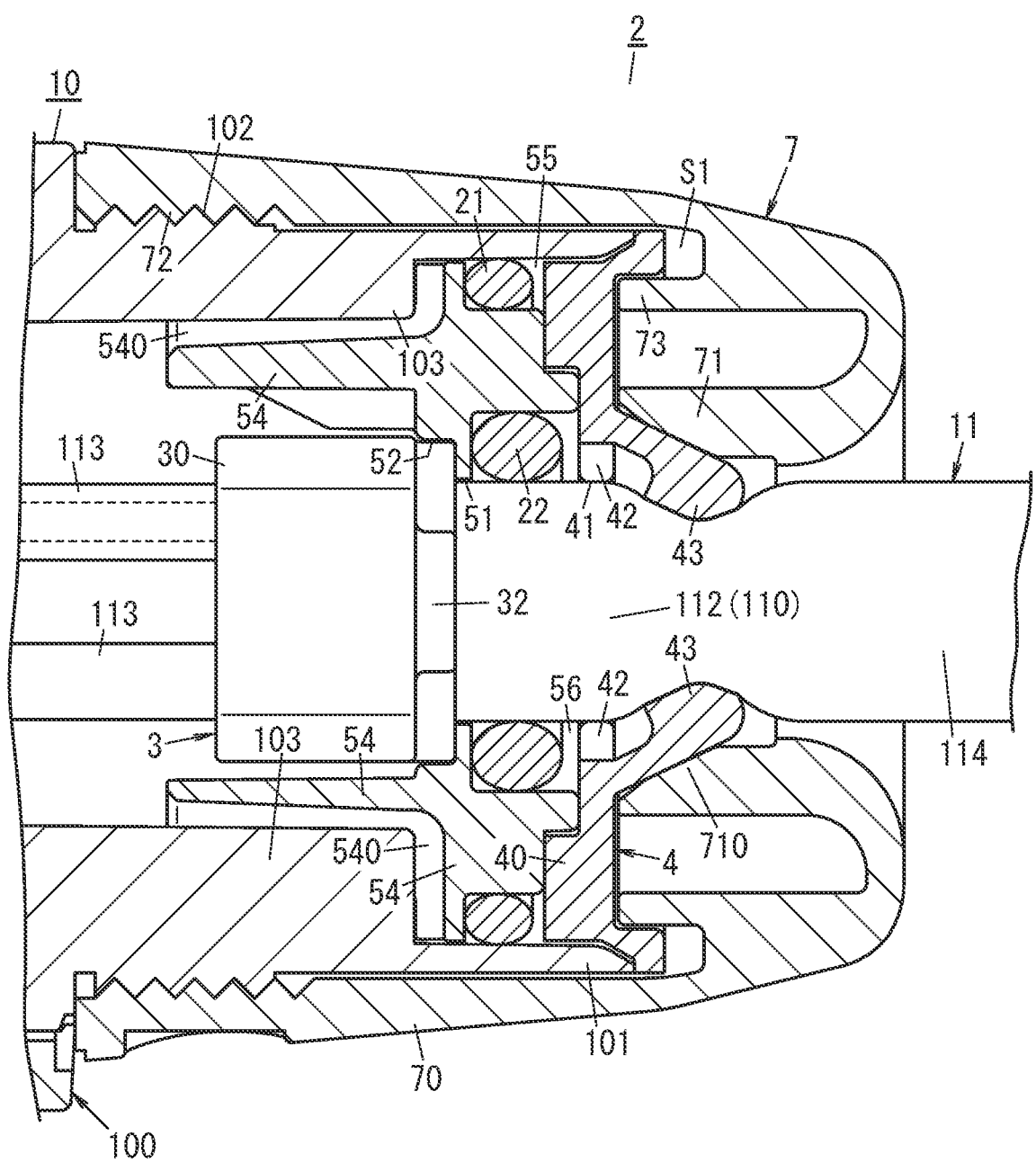
FIG. 7 is a cross-sectional view of the cable connection device.

The second holder 4 is configured to hold an intermediate part 112 of the end 110 of the first cable 11 (refer to FIG. 7). The second holder 4 includes a main body 40 as a synthetic resin molding product having a disk shape (FIGS. 4 and 5). The main body 40 has a circular hole 41, disposed in a center of the main body 40. The hole 41 is provided to penetrate the center of the main body 40 in a thickness direction (axial direction) of the main body 40 (refer to FIG. 7).

The main body 40 is provided with two or more protrusions 42 that are protruded from an inner circumferential surface of the hole 41 (refer to FIGS. 5 and 7). The main body 40 is further provided with two or more claws 43 that are arranged along an edge of the hole 41. The protrusions 42 and the claws 43 are formed integrally with the main body 40 such that the protrusions 42 are arranged adjacent to each other along a circumferential direction of the hole 41 and the claws 43 are also arranged adjacent to each other along the circumferential direction (refer to FIGS. 4 and 7).

Each of the two or more claws 43 has a hook-shape (refer to FIG. 7). The two or more claws 43 are provided to be displaceable to fall toward the hole 41. The two or more claws 43 are in contact with the sheath 114 of the first cable 11 inserted into the hole 41, when falling toward the hole 41. By the two or more claws 43 being in contact with the sheath 114, the second holder 4 can reduce the chance that the electric wires 113A to 113D are easily pulled out from the hole 41, even when the pulling force is applied to the first cable 11.

The first cable 11 is positioned to the center of the hole 41 by tips of the two or more protrusions 42 being in contact with the sheath 114 of the first cable 11 inserted into the hole 41 (refer to FIG. 7). The second holder 4 can cause the two or more claws 43 to be evenly in contact with the sheath 114, when the first cable 11 is positioned to the center of the hole 41 by the two or more protrusions 42. Therefore, the second holder 4 can further reduce the chance that the electric wires 113A to 113D are pulled out from the hole 41, even when the pulling force is applied to the first cable 11.

(2-3) Support

The support 5 is disposed between the first holder 3 and the second holder 4 to be along an axial direction (longitudinal direction) of the first cable 11 and configured to support the first holder 3 (refer to FIG. 7). The support 5 includes a main body 50 formed like an annular shape, which has a circular hole 51 in the center (refer to FIGS. 4, 5 and 7). The main body 50 is provided with a restriction part 52 that is disposed on a first surface (i.e., a surface facing the first holder 3; the same applies to the following) of the main body 50 (refer to FIG. 5). The restriction part 52 may be implemented as a recess having a shape that a circle and a quadrangle are connected to each other. The restriction part 52 is provided to fit with a protruded part 32 that is protruded from a first surface (i.e., a surface facing the support 5; the same applies to the following) of the main body 30 of the first holder 3 (refer to FIGS. 4, 6 and 7).

Thus, the support 5 can support the first holder 3 while restricting turning of the first holder 3 along the circumferential direction of the first cable 11, by the restriction part 52 being fitted with the protruded part 32.

The main body 50 is provided with a pair of first protrusion pieces 53 and a pair of second protrusion pieces 54, which are disposed on the first surface of the main body 50 (refer to FIG. 5). The pair of first protrusion pieces 53 are disposed at positions of facing each other to interpose the restriction part 52 therebetween. The pair of second protrusion pieces 54 are disposed at positions of facing each other to interpose the restriction part 52 therebetween and disposed at positions between the pair of first protrusion pieces 53. The pair of first protrusion pieces 53 (along the thickness direction of the main body 50) are longer than the pair of second protrusion pieces 54.

The main body 50 is provided with a first housing part 55 and a second housing part 56, which are disposed in a second surface of the main body 50 (i.e., a surface facing the second holder 4; the same applies to the following) (refer to FIGS. 4 and 7). The first housing part 55 is recessed in the thickness direction of the main body 50 to be along the circumference of the main body 50. The second housing part 56 is implemented as a recess having a cylindrical shape to surround the hole 51. The first housing part 55 houses therein the first sealing part 21 implemented as an O-ring (refer to FIG. 7). The second housing part 56 houses therein the second sealing part 22 implemented as an O-ring that has a diameter smaller than that of the first sealing part 21 (refer to FIG. 7).

(2-4) Connector

The connector 6 includes four contacts 60, and a housing 61 implemented as a synthetic resin molding product (refer to FIGS. 4 and 5). The four contacts 60 are respectively fixed to tips of the four electric wires 113A to 113D in one-to-one to be electrically connected to conductors of the four electric wires 113A to 113D. The housing 61 includes four contact housing parts 610 for housing the four contacts 60 in one-to-one. Each of the four contact housing parts 610 has a square tubular shape, of which both ends are opened.

(2-5) Cap

The cap 7 includes a cap body 70, a tubular part 71, and a screw part 72 (refer to FIGS. 4, 5, and 7). The cap body 70 is made of a synthetic resin material and has a cylindrical shape tapered. The tubular part 71 has a cylindrical shape and provided to extend toward the inside of the cap body 70 from a tip of the cap body 70 (refer to FIGS. 4 and 7). The tubular part 71 has a tip part 710 which is inclined such that its thickness is made thinner toward a tip of the tubular part 71 (refer to FIG. 7). The screw part 72 is disposed in an inner circumferential surface of a rear end part of the cap body 70 (refer to FIGS. 5 and 7). The cap body 70 is provided with a peripheral wall 73 that is disposed inside of the tip of the cap body 70 and has a cylindrical shape to surround the tubular part 71. Note that, a gap 51 is provided between the peripheral wall 73 and the inner circumferential surface of the cap body 70 (refer to FIG. 7).

The cap 7 in this embodiment is attached to the attachment part 101 provided for the casing 100 of the power feed control device body 10. The attachment part 101 has a cylindrical shape (refer to FIG. 2). The attachment part 101 has a rear end part (i.e., a part connecting to the casing 100), which is provided with a screw part 102 in an outer circumferential surface of the rear end part. The attachment part 101 is provided with two ribs 103, which are disposed on an inner circumferential surface of the attachment part 101 (refer to FIGS. 2 and 7). Each rib 103 is protruded linearly from the inner circumferential surface of the attachment part 101 to extend along an axial direction of the attachment part 101. The two ribs 103 are disposed at 180-degrees rotationally symmetrical positions along the inner circumferential surface of the attachment part 101 (refer to FIG. 7). Note that, the two ribs 103 are respectively fitted with recesses 540 in one-to-one, which are provided in outside surfaces of the pair of second protrusion pieces 54 of the support 5 (refer to FIG. 7).

(3) Assembling Procedure of Cable Connection Device

Next, the procedure of assembling the cable connection device 2, and attaching the cable connection device 2 thus assembled to the end 110 of the first cable 11 will be described. An assembling worker at first inserts the end 110 of the first cable 11 into the tubular part 71 from the tip of the cap 7. The assembling worker then inserts the end 110 of the first cable 11 into the hole 41 of the main body 40 of the second holder 4, the second sealing part 22, the first sealing part 21, and the hole 51 of the main body 50 of the support 5 in that order (refer to FIGS. 4 and 5).

Next, the assembling worker removes part of the sheath 114 from the tip part 111 of the end 110 of the first cable 11, and then forms the first holder 3 by insert-molding the sheath 114 remained to the tip part 111 and parts of the four electric wires 113A to 113D (refer to FIGS. 4 to 6). The assembling worker respectively fixes the contacts 60 to the tips of the four electric wires 113A to 113D in one-to-one, and then houses the contacts 60 in the four contact housing parts 610 of the housing 61 in one-to-one. The assembling worker then fits the protruded part 32 of the first holder 3 and the restriction part 52 of the support 5 with each other to couple the first holder 3 and the support 5. Furthermore, the assembling worker houses the first sealing part 21 and the second sealing part 22 in the first housing part 55 and the second housing part 56 of the support 5, respectively, and then inserts the connector 6 into the attachment part 101 of the casing 100. At that time, the assembling worker fits the two ribs 103 of the attachment part 101 with the recesses 540 of the pair of second protrusion pieces 54 of the support 5, respectively. Note that, the four contacts 60 of the connector 6, inserted in the attachment part 101, are electrically and mechanically connected to four contacts on the reception side, which are housed in the casing 100.

Next, the assembling worker houses the second holder 4, the support 5, the first holder 3 and the connector 6 in the cap body 70 of the cap 7 and then covers the attachment part 101 with the cap 7. The assembling worker then turns the cap 7 clockwise to screw the screw part 72 provided in the inner circumferential surface of the cap body 70 into the screw part 102 provided in the outer circumferential surface of the attachment part 101. The assembling worker then attaches the cap 7 to the attachment part 101 and fixes the cable connection device 2 to the power feed control device body 10. Thus, the assembling worker can connect the first cable 11 to the power feed control device body 10, using the cable connection device 2.

(4) Explanations Relating to Retaining and Sealing of Cable Connection Device

The second holder 4 is held between the tip of the attachment part 101 and the tip part 111 of the tubular part 71 of the cap 7 in a state where the cap 7 is attached to the attachment part 101, thereby the second holder 4 being fixed to the casing 100 (refer to FIG. 7). The two or more claws 43 of the second holder 4 are pushed by the tip part 111 of the tubular part 71 to fall-down, thereby those claws 43 being in contact with the sheath 114 of the first cable 11. Therefore, the second holder 4 can hold the intermediate part 112 of the end 110 of the first cable 11. When the first cable 11 is pulled in a direction away from the power feed control device body 10, the support 5 is abutted on the second holder 4. The first holder 3 is supported by the second holder 4 through the support 5 to restrict movement of the first cable 11 in a pulling direction of the first cable 11. That is to say, the first holder 3 and the second holder 4 of the cable connection device 2 can reduce the chance that the first cable 11 is easily pulled out from the power feed control device body 10.

Also in the state where the cap 7 is attached to the attachment part 101, the gap between the attachment part 101 of the casing 100 and the cable connection device 2 (i.e., a space between the support 5 and the attachment part 101) is generally filled with the first sealing part 21 (refer to FIG. 7). Therefore, even if liquid such as water has entered through the gap between the cap 7 and the attachment part 101, the liquid can be prevented from entering the casing 100 by the first sealing part 21. In addition, in the state where the cap 7 is attached to the attachment part 101, the gap between the cap 7 and the first cable 11 (i.e., a space between the hole 51 of the support 5 and the sheath 114) is generally filled with the second sealing part 22 (refer to FIG. 7). Therefore, even if the liquid has entered the cap 7 through the gap between the tubular part 71 of the cap 7 and the first cable 11, the liquid can be prevented from entering the casing 100 by the second sealing part 22.

As described above, the cable connection device 2 includes the first sealing part 21 and the second sealing part 22, which can suppress entrance of the liquid such as water into the electric apparatus (power feed control device body 10).

(5) The Other

The electric apparatus, to which the cable connection device 2 according to an embodiment connects the end of the cable, does not have to be the power feed control device body 10. The electric apparatus may be also an electric apparatus other than the power feed control device body 10. The first cable 11 does not have to be the four-core electric cable, but may be also a three-core or less electric cable, or a five-core or more electric cable.

(6) Recapitulation

A cable connection device (2) according to a first aspect of the present disclosure is configured to connect an end (110) of a cable (first cable 11) to an electric apparatus (power feed control device body 10). The cable connection device (2) according to the first aspect includes a first holder (3), a second holder (4) and a support (5). The first holder (3) is configured to hold a tip part (111) of the end (110). The second holder (4) is configured to hold an intermediate part (112) of the end (110). The support (5) is configured to support the first holder (3). The second holder (4) is fixed with respect to the electric apparatus. The first holder (3) is supported by the second holder (4) through the support (5) to restrict at least movement of the cable in a pulling direction of the cable.

The cable connection device (2) according to the first aspect includes the first holder (3) and the second holder (4), which can reduce the chance that the cable is easily pulled out from the electric apparatus, in other words, which can relieve tension applied to the cable.

A cable connection device (2) according to a second aspect of the present disclosure may be implemented in conjunction with the first aspect. In the cable connection device (2) according to the second aspect, the second holder (4) preferably includes one or more claws (43) disposed to be in contact with a sheath (114) in the end (110), of the cable.

In the cable connection device (2) according to the second aspect, the one or more claws (43) are disposed to be in contact with the sheath (114) of the cable, which can suitably realize holding of the cable by the second holder (4).

A cable connection device (2) according to a third aspect of the present disclosure may be implemented in conjunction with the second aspect. In the cable connection device (2) according to the third aspect, the second holder (4) preferably includes one or more protrusions (42) protruded toward the end (110) from an inner circumferential surface of a hole (41) of the second holder, into which the end (110) is inserted.

In the cable connection device (2) according to the third aspect, the cable can be positioned with respect to the hole (41) and the one or more claws (43) can be therefore certainly in contact with the sheath (114) of the cable, by causing the tips of the one or more protrusions (42) to be in contact with the sheath (114) of the cable inserted into the hole (41). As a result, the cable connection device (2) according to the third aspect can further relieve the tension applied to the cable.

A cable connection device (2) according to a fourth aspect of the present disclosure may be implemented in conjunction with the third aspect. The cable connection device (2) according to the fourth aspect preferably further includes a cap (7) having a tubular shape. The cap (7) is preferably provided to accommodate therein the first holder (3), the second holder (4) and the support (5). The one or more claws (43) are preferably provided to be in contact with an inner wall surface (tip part 710) of the cap (7) to deform in a direction of approaching the sheath (114), while the second holder (4) is accommodated in the cap (7).

In the cable connection device (2) according to the fourth aspect, deforming of the one or more claws (43) to be automatically achieved by the second holder (4) being accommodated in the cap (7), which can improve workability of assembly work.

A cable connection device (2) according to a fifth aspect of the present disclosure may be implemented in conjunction with any one of the first to fourth aspects. In the cable connection device (2) according to the fifth aspect, the cable preferably includes two or more electric wires (113A to 113D) covered with a sheath (114). The first holder (3) preferably has two or more insertion holes (31) into which the two or more electric wires (113A to 113D) are respectively inserted in one-to-one.

In the cable connection device (2) according to the fifth aspect, holding of the two or more electric wires (113A to 113D) by the first holder (3) can be suitably achieved by the two or more electric wires (113A to 113D) being respectively inserted into the two or more insertion holes (31) in one-to-one.

A cable connection device (2) according to a sixth aspect of the present disclosure may be implemented in conjunction with the fifth aspect. In the cable connection device (2) according to the sixth aspect, the two or more insertion holes (31) are preferably curved or bent.

In the cable connection device (2) according to the sixth aspect, the two or more insertion holes (31) are curved or bent, which can further relieve the tension applied to the cable.

A cable connection device (2) according to a seventh aspect of the present disclosure may be implemented in conjunction with any one of the first to sixth aspects. The cable connection device (2) according to the seventh aspect preferably further includes a first sealing part (21) disposed to fill a gap between the support (5) and the electric apparatus to prevent liquid from entering through the gap.

In the cable connection device (2) according to the seventh aspect, the gap between the support (5) and the electric apparatus is filled with the first sealing part (21) to prevent liquid from entering through the gap, which can suppress entrance of the liquid such as water into the electric apparatus.

A cable connection device (2) according to an eighth aspect of the present disclosure may be implemented in conjunction with any one of the first to seventh aspects. The cable connection device (2) according to the eighth aspect preferably further includes a second sealing part (22) disposed to fill a gap between the support (5) and the end (110) to prevent liquid from entering through the gap.

In the cable connection device (2) according to the eighth aspect, the gap between the support (5) and the end (110) is filled with the second sealing part (22) to prevent liquid from entering through the gap, which can suppress entrance of the liquid such as water into the electric apparatus.

A cable connection device (2) according to a ninth aspect of the present disclosure may be implemented in conjunction with any one of the first to eighth aspects. In the cable connection device (2) according to the ninth aspect, the support (5) preferably includes a restriction part (52) disposed to restrict turning of the first holder (3) along a circumferential direction of the cable.

In the cable connection device (2) according to the ninth aspect, the turning of the first holder (3) along the circumferential direction of the cable is restricted by the restriction part (52), which can suppress twisting of the cable.

A cable connection device (2) according to a tenth aspect of the present disclosure may be implemented in conjunction with any one of the first to ninth aspects. The cable connection device (2) according to the tenth aspect preferably further includes a connector (6) configured to be removably inserted in the electric apparatus to electrically connect the cable to the electric apparatus.

The cable connection device (2) according to the tenth aspect includes the connector (6), which can improve workability of connection work of electrically connecting the cable to the electric apparatus.

A cable connection device (2) according to an eleventh aspect of the present disclosure may be implemented in conjunction with any one of the first to tenth aspects. In the cable connection device (2) according to the eleventh aspect, the electric apparatus is preferably configured to feed power to a load through a power feeding path (LP) including the cable. The electric apparatus is preferably configured to stop feeding the power to the load in response to that an abnormality is present in the power feeding path (LP).

In the cable connection device (2) according to the eleventh aspect, the cable can be connected to the electric apparatus capable of protecting the load from the abnormality in the power feeding path (LP).

A power feed control device (1) according to a twelfth aspect of the present disclosure includes the cable connection device (2) according to the eleventh aspect, the cable and the electric apparatus.

The power feed control device (1) according to the twelfth aspect includes the cable connection device (2), which can relieve tension applied to the cable.

REFERENCE SIGNS LIST

1 Power Feed Control Device
2 Cable Connection Device
3 First Holder
4 Second Holder
5 Support
6 Connector
7 Cap
10 Power Feed Control Device Body (Electric Apparatus)
11 First Cable (Cable)
21 First Sealing Part
22 Second Sealing Part
31 Insertion Hole
41 Hole
42 Protrusion
43 Claw
52 Restriction Part
110 End
111 Tip Part
112 Intermediate Part
113A-113D Electric Wire
114 Sheath
710 Tip Part
LP Power Feeding Path

The invention claimed is:

1. A cable connection device configured to connect an end of a cable to an electric apparatus, the cable connection device comprising:
    a first holder configured to hold a tip part of the end;
    a second holder configured to hold an intermediate part of the end; and
    a support configured to support the first holder,
    the second holder being fixed with respect to the electric apparatus, the first holder being supported by the second holder through the support to restrict at least movement of the cable in a pulling direction of the cable, the second holder including one or more claws disposed to be in contact with a sheath in the end of the cable, and the second holder including one or more protrusions protruded toward the end from an inner circumferential surface of a hole of the second holder, into which the end is inserted.

2. The cable connection device of claim 1, further comprising a cap having a tubular shape and provided to accommodate therein the first holder, the second holder and the support, wherein the one or more claws are provided to be in contact with an inner wall surface of the cap to deform in a direction of approaching the sheath, while the second holder is accommodated in the cap.

3. The cable connection device of claim 1, wherein the cable includes two or more electric wires covered with a sheath, and the first holder has two or more insertion holes into which the two or more electric wires are respectively inserted in one-to-one.

4. The cable connection device of claim 3, wherein the two or more insertion holes are curved or bent.

5. The cable connection device of claim 1, further comprising a first sealing part disposed to fill a gap between the support and the electric apparatus to prevent liquid from entering through the gap.

6. The cable connection device of claim 1, further comprising a second sealing part disposed to fill a gap between the support and the end to prevent liquid from entering through the gap.

7. The cable connection device of claim 1, wherein the support includes a restriction part disposed to restrict turning of the first holder along a circumferential direction of the cable.

8. The cable connection device of claim 1, further comprising a connector configured to be removably inserted in the electric apparatus to electrically connect the cable to the electric apparatus.

9. The cable connection device of claim 1, wherein the electric apparatus is configured to feed power to a load through a power feeding path including the cable, and stop feeding the power to the load in response to that an abnormality is present in the power feeding path.

10. A power feed control device, comprising:

a cable;

an electric apparatus configured to feed power to a load through a power feeding path including the cable, and stop feeding the power to the load in response to that an abnormality is present in the power feeding path; and a cable connection device configured to connect an end of the cable to the electric apparatus, the cable connection device comprising:

a first holder configured to hold a tip part of the end;

a second holder configured to hold an intermediate part of the end; and a support configured to support the first holder, the second holder being fixed with respect to the electric apparatus, the first holder being supported by the second holder through the support to restrict at least movement of the cable in a pulling direction of the cable, the second holder including one or more claws disposed to be in contact with a sheath in the end of the cable, and the second holder including one or more protrusions protruded toward the end from an inner circumferential surface of a hole of the second holder, into which the end is inserted.

11. A cable connection device configured to connect an end of a cable to an electric apparatus, the cable connection device comprising:

a first holder configured to hold a tip part of the end;

a second holder configured to hold an intermediate part of the end; and a support configured to support the first holder, the second holder being fixed with respect to the electric apparatus, the first holder being supported by the second holder through the support to restrict at least movement of the cable in a pulling direction of the cable, the cable including two or more electric wires covered with a sheath, and the first holder has two or more insertion holes into which the two or more electric wires are respectively inserted in one-to-one, the two or more insertion holes are curved or bent.

* * * * *